United States Patent [19]

Melzer et al.

[11] Patent Number: 4,645,723

[45] Date of Patent: Feb. 24, 1987

[54] PRODUCTION OF MAGNETIC RECORDING MEDIA POSSESSING A BACKING COATING, AND MAGNETIC RECORDING MEDIA THUS PRODUCED

[75] Inventors: Milena Melzer; Hermann Roller, both of Ludwigshafen; Norbert Schneider, Altrip; Horst Fitterer, Mannheim; Wulf Muenzner, Frankenthal, all of Fed. Rep. of Germany

[73] Assignee: BASF Aktiengesellschaft, Fed. Rep. of Germany

[21] Appl. No.: 702,250

[22] Filed: Feb. 15, 1985

[30] Foreign Application Priority Data

Feb. 18, 1984 [DE] Fed. Rep. of Germany ....... 3405960

[51] Int. Cl.[4] ............................................... G11B 5/70
[52] U.S. Cl. .................................... 428/694; 427/128; 427/131; 428/336; 428/900
[58] Field of Search ............... 428/694, 695, 900, 336; 427/131, 128

[56] References Cited

U.S. PATENT DOCUMENTS

| | | |
|---|---|---|
| 3,293,066 | 12/1966 | Haines ................................ 428/900 |
| 4,032,682 | 6/1977 | Masson ................................ 428/694 |
| 4,135,031 | 1/1979 | Akashi et al. ....................... 428/323 |
| 4,388,360 | 6/1983 | Miyoshi et al. ........................... 10/2 |
| 4,439,486 | 3/1984 | Yamada ............................... 428/900 |

FOREIGN PATENT DOCUMENTS

| | | |
|---|---|---|
| 2352958 | 4/1975 | Fed. Rep. of Germany ............ 5/72 |
| 2500546 | 4/1979 | Fed. Rep. of Germany . |
| 3323441 | 12/1983 | Fed. Rep. of Germany ............ 5/72 |
| 1197661 | 7/1970 | United Kingdom ................ 428/900 |
| 1416946 | 12/1975 | United Kingdom ...................... 5/72 |
| 2103110 | 2/1983 | United Kingdom ...................... 3/6 |

*Primary Examiner*—Ellis P. Robinson
*Attorney, Agent, or Firm*—Keil & Weinkauf

[57] ABSTRACT

A process for the production of magnetic recording media by applying a magnetic layer, which consists essentially of magnetic material finely dispersed in organic polymers, to one side of a flexible base, and applying a non-magnetizable backing coating which is free of inorganic solids to that side of the base which is opposite the magnetic layer, wherein the backing coating consists of two or more polymers which are incompatible with one another and have precipitated from a solvent mixture, and magnetic recording media produced by this process.

4 Claims, No Drawings

PRODUCTION OF MAGNETIC RECORDING MEDIA POSSESSING A BACKING COATING, AND MAGNETIC RECORDING MEDIA THUS PRODUCED

The present invention relates to a process for the production of magnetic recording media by applying a magnetic layer, which consists essentially of magnetic material finely dispersed in organic polymers, to one side of a flexible base, and applying a non-magnetizable backing coating, which is free of inorganic solids, to that side of the base which is opposite the magnetic layer, the backing coating consisting of two or more polymers which are precipitated from a solvent mixture and are incompatible with one another, and to the magnetic recording media produced by this process.

It is known that flexible magnetic recording media can be provided with backing coatings containing non-magnetizable non-conductive and/or conductive substances.

U.S. Pat. No. 3,293,066 discloses that static electricity on magnetic tapes, which in the case of digital tape recorders of the reel-to-reel type can be produced at tape speedsabove 5 m/sec, can be eliminated by applying a conductive backing coating, which in turn makes the back of the tape more hard-wearing. Furthermore, British Pat. No. 1,197,661 and U.S. Pat. No. 4,135,031 teach that the winding properties of tapes can be improved by applying a backing coating having a predetermined surface roughness. Such backing coatings are also known for magnetic cards. Finally, German Pat. No. 2,500,546 discloses that backing coatings are also advantageous for video tapes. It is a particular advantage of the backing coating that it reduces the number of errors during playback because it prevents base material from being abraded from the back of the recording medium, which abraded material results in a large number of errors which cannot be tolerated particularly in the case of video tapes.

Hitherto, a pigmented backing coating has been used for this purpose, the pigments used in most cases being abrasive inorganic substances, such as silicates, titanium dioxide and synthetic silica. The use of graphite, carbon black, molybdenum disulfide and barium sulfate is also known. The binders used are conventional binders, such as polyacrylates, nylons, cellulose nitrates, polyesters, polyurethanes, phenoxy resins, vinyl chloride/acrylonitrile copolymers, and copolymers of vinyl chloride, vinyl acetate and vinyl alcohol. However, the mechanical stresses to which the backing coatings are subjected requires, as a rule, that it should be resilient. Hence, polyurethane elastomers are frequently combined with relatively brittle polymers, such as phenoxy resins, vinyl chloride/vinyl acetate copolymers, polycarbonates, etc.

However, these pigmented backing coatings produced by conventional methods have disadvantages. For example, incorporation of the pigment into the binder system by means of milling and dispersing requires a special process step. In particular, the asperities of the pigmented backing coating make indentations in the magnetic layer of the adjacent turn of tape when it is stored as a roll, and these indentations then result in a deterioration in those properties of the magnetic layer which are influenced by the surface smoothness, e.g. the signal/noise ratio in the case of video and computer tapes, the sensitivity at short wavelengths and maximum output level at short wavelengths in the case of audio tapes, and, quite generally, the recording and playback characteristics at high frequencies. The indentations produced by the asperities of the backing coating can also cause dropouts.

It is an object of the present invention to provide a magnetic recording medium which possesses a backing coating applied to that side of the base which is opposite the magnetic layer, the said recording medium not having the above disadvantages, and the backing coating possessing, in particular, the roughness which is required for excellent winding characteristics, but which does not result in the formation of indentations in the magnetic layer and hence in a deterioration in the signal/noise ratio.

We have found that this object is achieved, and that magnetic recording media which consist essentially of a flexible base, a magnetic layer which is firmly bonded to one side of the base and consists of magnetic material finely dispersed in organic polymers, and a non-magnetizable backing coating which is firmly bonded to the opposite side of the base and is free of inorganic solids, have the required properties, if, in order to form the backing coating, two or more polymers which are incompatible with one another are dissolved in a mixture of at least one low boiling solvent and at least one higher boiling solvent, the solution is applied in the form of a layer to the base, and the solvents are evaporated, with the proviso that the polymers are insoluble in the higher boiling solvent.

The novel magnetic recording media thus possess a backing coating which is free of inorganic solids and which consists of two or more polymers which are incompatible with one another. The said backing coating is produced by applying to the base a solution of a mixture of two or more binder components, which are incompatible with one another, in a solvent mixture. This mixture consists of two or more solvents which boil at different temperatures, the binder components being insoluble in the higher boiling component(s) of the solvent mixture. After this backing coating has been applied, the low boiling solvent component(s) in which the binder components are dissolved is/are the first to evaporate during the drying procedure, so that in the second phase the binder components are then precipitated from the solution and separate. This results in a rough coating whose surface character is similar to that of a rough pigmented backing coating.

A number of known polymers which are incompatible with one another are suitable for the purpose according to the invention. The following combinations of polymers which are incompatible with one another can particularly advantageously be used for producing the backing coating: epoxy resins/polyvinyl chloride, epoxy resins/polyvinylidene chloride, epoxy resins/vinyl chloride/vinyl acetate copolymers, epoxy resins/polyetherurethane, polyetherurethane/polyvinylformal, chlorinated rubber/polyvinyl formal, etc.

According to the invention, these polymer combinations which form the backing coating are dissolved in a solvent mixture consisting of at least one low boiling component and at least one higher boiling component. Suitable solvent mixtures are preferably those based on tetrahydrofuran and/or toluene and/or xylene and/or dioxane and/or water, and mixtures of toluene and acetone or toluene and ethyl acetate. In these mixtures, the amount of the low boiling component(s) is advantageously from 4 to 90% by weight.

To produce the backing coatings, it is necessary merely to dissolve the appropriate binders in the solvent mixture and to apply this solution, by a conventional method, to the back of the base of the magnetic recording medium, this base carrying the magnetic layer. If severe service conditions make it necessary, the mechanical properties of the backing coating can be improved by using binders which possess reactive groups, and which can then be crosslinked with the aid of polyisocyanates. Other non-particulate assistants, such as lubricants or antistatic agents, may also be added to the backing coating.

The surface roughness of the novel backing coatings is advantageously obtained by varying the ratio of the components in the polymer combination, the ratio of the solvent components and the polymer concentration in the solvent mixture. The coatings are usually from 0.3 to 1.5 μm thick.

Compared with prior art magnetic recording media in which the roughness of the backing coating is produced by pigmentation, magnetic recording media having a backing coating produced according to the invention are distinguished in particular by the fact that the backing coating is not so hard that, when the magnetic recording medium is stored as a roll, indentations are produced in the magnetic layer, but is still rough enough to ensure the requisite good winding properties of the recording medium. Such indentations would, in particular, have a negative effect on the recording and reproduction of high frequencies and would furthermore increase the number of errors. These disadvantages, which are particularly serious in the case of video tapes, are substantially avoided with the novel magnetic recording media.

Another advantage is that the process for the production of these backing coatings is simpler than other, conventional processes, and, because there is no need for the backing coating to contain hard solid particles to produce the necessary roughness, surface treatment of the magnetic layer can be carried out in one operation at the end of the process for producing the magnetic recording medium, without the roughness being troublesome or disadvantageous.

The Examples which follow illustrate the invention; the Comparative Experiments illustrate the state of the art. In the Examples and Comparative Experiments, parts and percentages are by weight, unless stated otherwise.

EXAMPLE 1

10 parts of an epoxy resin obtained from bisphenol A and epichlorohydrin and having an OH content of 6.1% and a molecular weight of 30,000 and 10 parts of an 80:10:10 copolymer of vinyl chloride, dimethyl maleate and diethyl maleate, having a K value of 60, were dissolved in a mixture of 392 parts of tetrahydrofuran and 588 parts of toluene, and the solution was applied, in a conventional coating apparatus by means of a gravure roller, to the back of a web of polyethylene terephthalate film provided with a magnetic layer suitable for video recording. When the backing coating had been dried with a stream of hot air at 70° C. flowing in a direction opposite to the direction of movement of the web, the roughness was determined by measuring the average peak-to-valley height $R_z$ and the center line average value $R_a$ according to DIN 4768, Sheet 1, and the weight per unit area $F_g$ was determined. The results are shown in Table 1.

EXAMPLE 2

The procedure described in Example 1 was followed, except that 15 parts of each of the stated polymers were dissolved in a mixture of 388 parts of tetrahydrofuran and 582 parts of toluene. The results are shown in Table 1.

EXAMPLE 3

The procedure described in Example 1 was followed, except that 20 parts of each of the stated polymers were dissolved in a mixture of 384 parts of tetrahydrofuran and 576 parts of toluene. The results are shown in Table 1.

EXAMPLE 4

The procedure described in Example 1 was followed, except that 30 parts of each of the stated polymers were dissolved in a mixture of 376 parts of tetrahydrofuran and 564 parts of toluene. The results are shown in Table 1.

TABLE 1

| | $R_z$ [μm] | $R_a$ [μm] | $R_z:R_a$ | $F_g$ [g/cm$^2$] |
|---|---|---|---|---|
| Example 1 | 0.80 | 0.065 | 13.5:1 | 0.12 |
| Example 2 | 0.80 | 0.080 | 10:1 | 0.15 |
| Example 3 | 0.78 | 0.094 | 8:1 | 0.19 |
| Example 4 | 1.44 | 0.27 | 5.3:1 | 0.42 |
| tape base material | 0.56 | 0.052 | 10.7:1 | — |

EXAMPLE 5

The procedure described in Example 1 was followed, except that 24 parts of each of the two polymers were dissolved in a mixture of tetrahydrofuran and toluene in the amounts shown in Table 2. When these solutions had been applied, by means of a gravure roller, to the back of a web of polyethylene terephthalate film provided with a magnetic layer, and drying had been carried out, the layer thicknesses d shown in Table 2 were obtained. The web was slit into ½ inch wide magnetic tapes, and these were then wound at high speed into rolls to assess their winding properties, the rolls formed being examined to see if there were any projecting turns of tape. In contrast to magnetic tapes slit from the web provided only with the magnetic layer, the novel magnetic tapes all produced an evenly wound roll with smooth sides. The roughnesses $R_z$ and $R_a$ parallel with, and transverse to, the direction of application were determined on the tape samples.

The results are shown in Table 2, in comparison with those for the tape base material.

TABLE 2

| | Tetrahydrofuran/toluene (parts) | Layer thickness d [μm] | $R_z$ parallel/transverse [μm] | $R_a$ parallel/transverse [μm] |
|---|---|---|---|---|
| Example 5a | 301/454 | 0.7 | 1.29/1.30 | 0.17/0.14 |
| Example 5b | 376/376 | 0.8 | 1.23/1.13 | 0.20/0.17 |
| Example 5c | 451/301 | 0.8 | 1.36/1.26 | 0.24/0.27 |
| Example 5d | 526/226 | 0.7 | 11.6/1.30 | 0.21/0.22 |
| Example 5e | 677/75 | 0.5 | 0.50/0.78 | 0.053/0.078 |
| Tape base material | — | — | 0.56/0.56 | 0.052/0.052 |

3.81 mm wide tapes were slit from the coated web provided with a backing coating according to Example 5b, and the tapes were loaded into cassettes. The wow and flutter measured according to DIN 45,507 was 0.34% for these tapes, and 0.77% for those without a backing coating.

EXAMPLE 6

15 parts of the epoxy resin stated in Example 1 and 15 parts of a 91:3:6 copolymer of vinyl chloride, vinyl acetate and vinyl alcohol, having a K value of 48, were dissolved in a solvent mixture consisting of 188 parts of tetrahydrofuran and 282 parts of toluene. This solution was then mixed, while stirring vigorously, with 14.2 g of a 75% strength solution of a triisocyanate obtained from 3 moles of toluylene diisocyanate and 1 mole of trimethylolpropane in ethyl acetate, so that 60% of the reactive groups of the polymers were crosslinked.

Immediately thereafter, this solution was applied, using a coating apparatus having a gravure roller, to the back of a web of polyethylene terephthalate film coated with a conventional magnetic layer, and drying was then carried out in a tunnel dryer heated to 70° C. The measured roughness values were as follows: $R_z = 0.83$ μm, and $R_a = 0.10$ μm.

The coated web thus obtained was then slit into ½ inch wide tapes, and these were loaded into VHS video cassettes.

Measurements on these were then carried out, against the standard tape 868 KM/14 B, on a commercial Pal 19 VHS recorder of Victor Company of Japan. The results of the measurements are shown in Table 3.

COMPARATIVE EXPERIMENT 1

The procedure of Example 6 was followed, except that the backing coating was omitted. Measurements on the resulting ½ inch wide tapes were carried out as described in Example 6. The results are shown in Table 3. The roughness values of the tape base material were as follows: $R_z = 0.56$ μm and $R_a = 0.052$ μm.

TABLE 3

| | Comparative Experiment 1 | Example 6 |
|---|---|---|
| RF level at 5 MHz [dB] | +1.5 | +1.5 |
| Chroma output at 650 kHz [dB] | +3.0 | +3.0 |
| Luminance S/N at 5 MHz [dB] | +0.5 | +0.5 |
| Chroma S/N at 650 kHz [dB] | +1.0 | +1.0 |
| Audio output at 1 kHz [dB] | +2.0 | +2.0 |
| Audio output at 5 kHz [dB] | +0.5 | +0.5 |
| Errors/min* | 30 | 31 |

*The number of errors is the number of drops in the signal level which are greater than 15 dB and last for more than 15 μsec.

In contrast to the magnetic tape without a backing coating (Comparative Experiment 1), the tape with a backing coating (Example 6) exhibited good winding characteristics and formed an evenly wound roll without projecting turns of tape.

EXAMPLE 7

100 parts of each of the two polymers employed in Example 1 were dissolved in a solvent consisting of 2000 parts of tetrahydrofuran and 3000 parts of toluene, and the solution was applied, as described in Example 6, to the back of a web of polyethylene terephthalate film provided with a magnetic layer suitable for video recording. The measurements on the VHS video tapes produced therefrom were carried out as described in Example 6. The results are shown in Table 4.

COMPARATIVE EXPERIMENT 2

4.5 parts of conductive carbon having a specific surface area of from 150 to 220 m²/g and a pH of from 7 to 8, 72 parts of a 10% strength solution of a commercial elastomeric and isocyanate-free polyester urethane obtained from adipic acid, butane-1,4-diol and 4,4'-diisocyanatodiphenylmethane in a 1:1 tetrahydrofuran/dioxane mixture, 18 parts of a 10% strength solution of an epoxy resin obtained from bisphenol A and epichlorohydrin in a 1:1 tetrahydrofuran/dioxane mixture, and 0.045 part of isostearic acid were milled for 120 hours in a mill having a capacity of 250 parts and containing 400 parts of steel balls possessing a diameter of from 4 to 6 mm, 0.9 part of silicone oil was added, milling was continued for a further 24 hours, and 0.9 part of pyrogenic silica having a specific surface area of from 100 to 200 m²/g was then added. After the addition of a further 38.5 parts of a solvent mixture consisting of 29 parts of tetrahydrofuran, 28 parts of dioxane and 42 parts of cyclohexanone, milling was continued for a further 10 hours. The dispersion was then filtered and 0.125 part of a 50% strength solution of a triisocyanate, prepared from 3 moles of toluylene diisocyanate and 1 mole of 1,1,1-trimethylolpropane, in ethyl acetate was added per part of dispersion, after which the stirred dispersion was circulated for 30 minutes by means of a pump and then applied by means of a gravure roller to the back of a web of polyethylene terephthalate film provided with a magnetic layer, such as was used in Example 7, and to which a polyvinylidene chloride adhesion-promoting layer had already been applied; the layer of the dispersion was then dried in a tunnel dryer heated to 70° C.

Tape production and testing were carried out as described in Example 6. The results are shown in Table 4.

COMPARATIVE EXPERIMENT 3

A web of polyethylene terephthalate film provided with a magnetic layer suitable for video recording, such as was employed in Example 7, was processed directly into video tapes, as described in Example 6, and these video tapes were tested as described in that Example. The results of the measurements are shown in Table 4.

TABLE 4

| | Comparative Experiment 3 | Example 7 | Comparative Experiment 2 |
|---|---|---|---|
| $R_z$ (μm) | 0.38 | 0.96 | 0.95 |
| $R_a$ (μm) | 0.032 | 0.14 | 0.13 |
| RF level at 5 MHz [dB] | +1.6 | +1.4 | +1.0 |
| Chroma output at 650 kHZ [dB] | +3.0 | +3.0 | +3.0 |
| Luminance S/N at 5 MHz [dB] | +0.4 | ±0 | −0.6 |
| Chroma S/N at 650 kHz [dB] | +0.8 | +0.5 | ±0 |
| Audio output at 1 kHz [dB] | +1.8 | +1.6 | +1.6 |
| Audio output at 5 kHz [dB] | +0.4 | +0.6 | −0.2 |
| Errors/min | 32 | 40 | 80 |

In contrast to the magnetic tape without a backing coating (Comparative Experiment 3), the tapes possessing a backing coating (Example 7 and Comparative Experiment 2) exhibited equally good winding characteristics and formed evenly wound rolls without projecting turns of tape.

EXAMPLE 8

100 parts of each of the polymers stated in Example 1 and 5 parts of n-butyl stearate were dissolved in a solvent mixture consisting of 4500 parts of tetrahydrofuran and 500 parts of water. This solution was applied to the back of a web of polyethylene terephthalate film by means of a gravure roller. After the backing coating had been dried in a tunnel dryer heated to 70° C., a magnetic dispersion suitable for video recording was applied in a conventional manner, the magnetic particles were oriented in the recording direction, drying was carried out, and the web provided with the magnetic layer and backing coating was calendered. Tape production and testing were carried out as described in Example 6. The results are shown in Table 5.

COMPARATIVE EXAMPLE 4

A web of polyethylene terephthalate film provided with a magnetic layer, such as was employed in Example 8, was provided with a backing coating as described in Comparative Experiment 2. Tape production and testing were carried out as described in Example 6. The results are shown in Table 5.

COMPARATIVE EXPERIMENT 5

A web of polyethylene terephthalate film provided with a magnetic layer suitable for video recording, such as was employed in Example 8, was processed directly into video tapes, as described in Example 6, and these tapes were tested as described in that Example. The results of the measurements are shown in Table 5.

TABLE 5

|  | Comparative Experiment 5 | Example 8 | Comparative Experiment 4 |
| --- | --- | --- | --- |
| $R_z$ (μm) | 0.21 | 0.32 | 0.31 |
| $R_a$ (μm) | 0.030 | 0.045 | 0.043 |
| RF level at 5 MHz [dB] | +2 | +2 | +1.5 |
| Chroma output at 650 kHz [dB] | +3 | +3 | +3 |
| Luminance S/N at 5 MHz [dB] | +1 | +1 | 0 |
| Chroma S/N at 650 kHz [dB] | +1.5 | +1.5 | +0.5 |
| Audio output at 1 kHz [dB] | +2 | +1.8 | +1.8 |
| Audio output at 5 kHz [dB] | +0.5 | +0.8 | 0 |
| Errors/min | 25 | 18 | 75 |

We claim:

1. A process for the production of a magnetic recording media by applying a magnetic layer, containing magnetic material finely dispersed in organic polymers, to one side of a flexible base, and applying a non-magnetizable backing coating, which is free of inorganic solids, to that side of the base which is opposite the magnetic layer, wherein, in order to form the backing coating, at least two polymers which are incompatible with one another are dissolved in a mixture of at least one low boiling solvent and at least one higher boiling solvent, the solution is applied in the form of a layer to the base, and the solvents are evaporated, with the proviso that the polymers are insoluble in the higher boiling solvent.

2. A magnetic recording medium which comprises a flexible base, a magnetic layer which is firmly bonded to one side of the base and containing magnetic material finely dispersed in organic polymers and a non-magnetizable backing coating which is free of inorganic solids and is firmly bonded to the opposite side of the base, wherein the backing coating comprises at least two organic polymers which are incompatible with one another.

3. The process of claim 1, wherein the backing coating is about 0.3 to about 1.5 μm thick.

4. The composition of claim 2, wherein the backing coating comprises a precipitate of at least two organic polymers, said precipitation being effected by means of evaporation from a solvent mixture comprising at least one low boiling component in which the polymers are soluble and at least one higher boiling component in which the polymers are insoluble.

* * * * *